United States Patent
Op De Beeck et al.

(10) Patent No.: US 6,577,745 B1
(45) Date of Patent: Jun. 10, 2003

(54) WATERMARK DETECTION

(75) Inventors: Marc J. R. Op De Beeck, Eindhoven (NL); Jaap A. Haitsma, Eindhoven (NL); Geert F. G. Depovere, Eindhoven (NL); Antonius A. C. M. Kalker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/426,523

(22) Filed: Oct. 26, 1999

(30) Foreign Application Priority Data

Oct. 29, 1998 (EP) .................................. 98203659

(51) Int. Cl.$^7$ .......................... G06K 9/00; H04R 3/02
(52) U.S. Cl. .................................. 382/100; 381/73.1
(58) Field of Search ......................... 382/100, 275; 381/73.1; 380/252; 705/57; 704/216; 370/527, 529

(56) References Cited

U.S. PATENT DOCUMENTS

| | | | |
|---|---|---|---|
| 5,848,155 A | * 12/1998 | Cox | 380/202 |
| 5,930,369 A | * 7/1999 | Cox et al. | 283/113 |
| 6,256,347 B1 | * 7/2001 | Yu et al. | 375/240.13 |
| 6,272,253 B1 | * 8/2001 | Bannon et al. | 382/236 |
| 6,278,792 B1 | * 8/2001 | Cox et al. | 382/100 |
| 6,307,949 B1 | * 10/2001 | Rhoads | 382/100 |
| 6,341,350 B1 | * 1/2002 | Miyahara et al. | 713/176 |
| 6,381,341 B1 | * 4/2002 | Rhoads | 382/100 |
| 6,418,232 B1 | * 7/2002 | Nakano et al. | 359/2 |

FOREIGN PATENT DOCUMENTS

WO  WO9803014  1/1998  .......... W04N/7/08

* cited by examiner

Primary Examiner—Amelia M. Au
Assistant Examiner—Martin Miller
(74) Attorney, Agent, or Firm—Michael E. Belk

(57) ABSTRACT

An input image is distorted so that it has less correlation to a watermark and the distorted image is subtracted from the input image to provide a preprocessed image. If the correlation between the preprocessed image and a watermark is sufficient then the watermark is detected in the input image. The distortion may be a spatially-variant distortion such as stretching, shrinking, shearing or rotation or the distortion may be a non-linear transforming or filtering such as median, local minimum or local maximum filtering.

16 Claims, 3 Drawing Sheets

WATERMARK DETECTION

FIELD OF THE INVENTION

The invention relates to a field of detecting a watermark in a suspect image.

BACKGROUND OF THE INVENTION

A known method of detecting watermarks includes the steps of pre-processing the suspect image, determining the amount of correlation between the pre-processed image and the watermark, and generating a watermark detection signal depending on the amount of correlation. The invention also relates to a device for performing the method.

The method of detecting a watermark described above is disclosed in International Patent Application WO-A 98/03014. As described in this Application, conventional watermark detection is based on determining the amount of correlation of a suspect image with the watermark to be detected. If the amount of correlation is less than a given threshold, the watermark is said to be absent, otherwise it is said to be present. The larger the correlation, the more reliable the detection and the more processing of the watermarked image is allowed until the watermark cannot be detected anymore.

To improve the reliability of the watermark detection, the suspect image is pre-processed. In the know a watermark detection method, the pre-processing includes predictive or matched filtering of the suspect image prior to the conventional watermark detection. The processed image is more correlated with the watermark than the suspect image. Such a matched filter is a convolution filter, i.e. the filtered image is a spatially-invariant linear combination of global displacements of the same image. It is optimized to attenuate the frequencies for which the image dominates over the watermark. It works equally on the watermark and the underlying image.

The above citations are hereby incorporated in whole by reference.

SUMMARY OF THE INVENTION

It is an object of the invention to provide an improved method of detecting the watermark.

In the method of the invention, the pre-processing includes the steps of subjecting the suspect image to a non-convolution filter operation so as to obtain a distorted but resembling image which has less correlation with the watermark, and subtracting the distorted image from the suspect image.

A non-convolution filter is herein understood to mean a non-linear filter or a partially-variant linear filter.

The invention is based on the recognition that most watermarking schemes are of resistant to (even minor) non-linear or spatially variant distortions. Such distortions do not necessarily affect the perceptual appearance of the image, but destroy the watermark information. The distorted image resembles the original image but has less correlation with the watermark. This property is here exploited to improve the reliability of the watermark detection. By subtracting the distorted image from the suspect image, a difference image is obtained in which the ratio between the watermark information and the underlying residual image content is greatly enhanced. The performance of the subsequent conventional watermark detector is therefore considerably improved.

Examples of non-linear filters are median filters, local minimum filters and local maximum filters. Examples of spatially variant operations are stretching, shrinking, shearing, rotation, motion compensation and region-based shifting. Various advantageous embodiments are defined in the appended claims and disclosed in the following description.

Those skilled in the art will understand the invention and additional objects and advantages of the invention by studying the description of preferred embodiments below with reference to the following drawings which illustrate the features of the appended claims:

DESCRIPTION OF EMBODIMENTS

Figure 1:
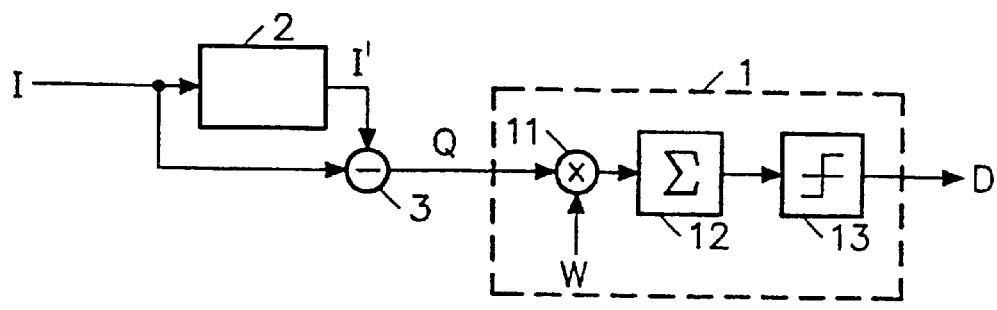
FIG. 1 shows a schematic diagram of a device for performing the method of detecting a watermark in accordance with the invention.

FIG. 1 shows a device for detecting a watermark in a suspect image in accordance with the invention. The arrangement receives a suspect image I. Before applying the suspect image to a conventional watermark detector 1, the image is preprocessed by an arrangement including a non-convolution filter 2 (hereinafter also referred to as distortion circuit) and a subtraction circuit 3 which subtracts the distorted image I' from the suspect image I. The difference image Q is applied to the conventional watermark detector 1.

The conventional watermark detector 1 includes a multiplier 11, a summation circuit 12 and a threshold circuit 13. The multiplier 11 and the summation circuit 12 constitute a correlation circuit. The multiplier receives the difference image Q and an applied watermark W. The watermark W is a matrix of data values $w_{ij}$ that may have been added to the corresponding pixels $p_{ij}$ of an image P in a perceptually unobtrusive manner.

The task of the device, which is shown in FIG. 1, is to detect whether the suspect image I is watermarked (I=P+W) or not (I=P). To this end, the correlation circuit (11,12) calculates the inner product <Q,W> of the difference image Q and the watermark W, defined as:

$$\langle Q, W \rangle = \frac{1}{N_1 N_2} \sum_{i=1}^{N_1} \sum_{j=1}^{N_2} q_{ij} w_{ij}$$

in which $N_1$ and $N_2$ are the width and height of the image in number of pixels, $q_{ij}$ denotes the pixel value of the difference image Q at position (i,j), and $w_{ij}$ is the watermark data value at pixel position (i,j). It will be appreciated that, if the image signal is an analog signal, the summation circuit 12 will be an integrator.

The calculation of the correlation <Q,W> is often carried out in the Fourier domain. Because the dynamic range of the difference image Q in the Fourier domain is small, the difference image can be represented by integers rather than floating point numbers. This reduces the hardware complexity considerably.

The output <Q,W> of the summation circuit 12 represents an amount of correlation between the input signal Q and the applied watermark W. The threshold circuit 13 determines whether the amount of correlation exceeds a predetermined threshold. If that is the case, detection signal D=1 is generated to indicate the presence of the watermark. Otherwise the watermark is said to be absent (D=0).

Figure 2:
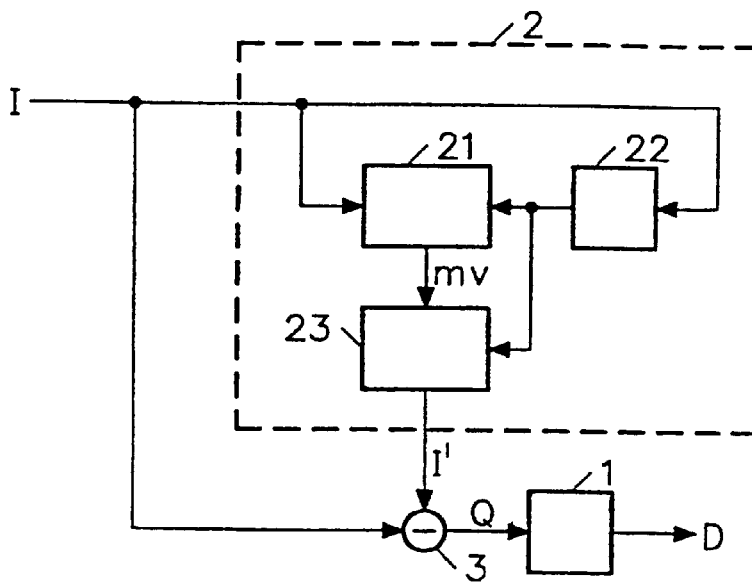
FIG. 2 shows an embodiment of a device for detecting the watermark in accordance with the invention.

FIG. 2 shows an embodiment of the watermark detection device in accordance with the invention. In this embodiment, the suspect image I is one of a sequence of images together constituting a motion video signal. The distortion circuit 2 includes a motion estimation circuit 21, a memory 22, and a motion compensation circuit 23. An earlier image of the sequence is available at the output of the memory 22. The earlier image (hereinafter referred to as reference image) may be the previous image or spaced a number of images apart. It may have the same watermark as the current image. The reference image and the current image are applied to the motion estimation circuit 21. Motion estimation is a well-known operation in the field of image coding and needs no detailed explanation. It suffices to mention that the motion estimation circuit 21 searches, for each image block of the current image I, the most resembling image block in memory 22, and generates a motion vector mv indicating the relative position of the block thus found. It is important to note that the motion estimation is hardly affected by the embedded watermark, if any, because the image content is dominant.

Figure 3A:
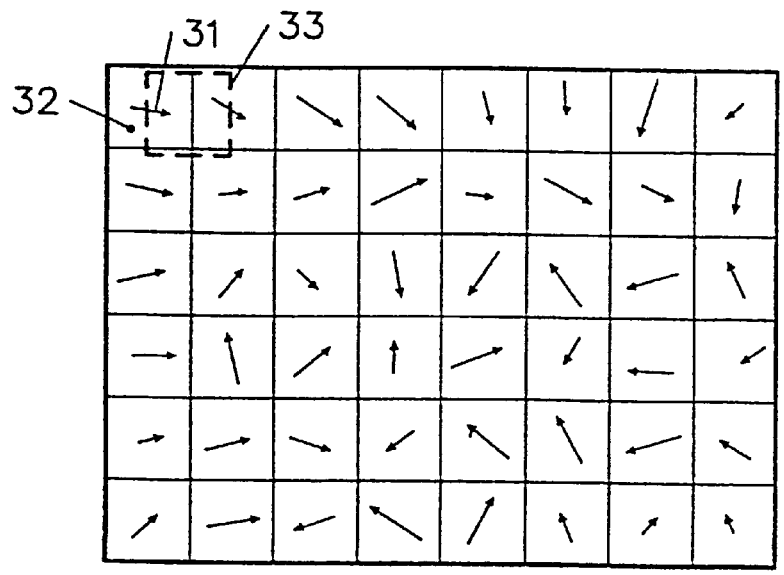
FIGS. 3A–3C show diagrams to illustrate the operation of the device which is shown in FIG. 2.
Figure 3B:
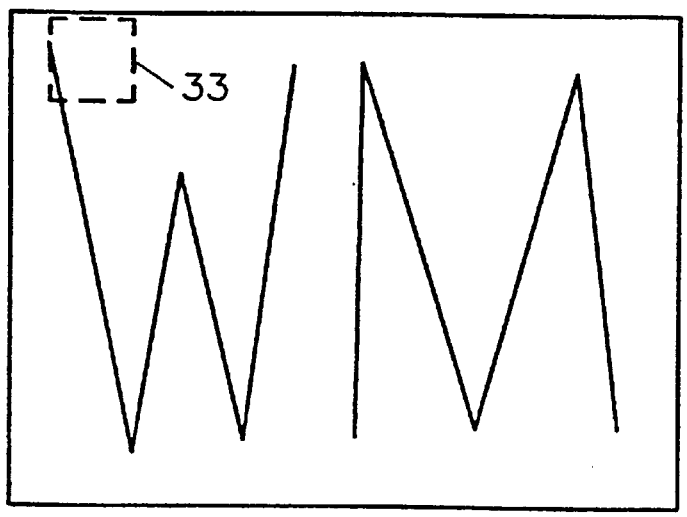
Figure 3C:
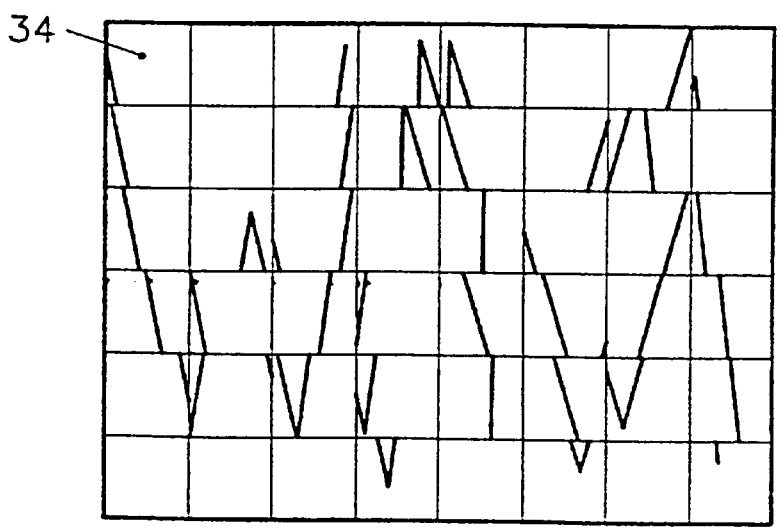

The motion vectors mv and the reference image are then applied to the motion estimation circuit 23 to obtain a prediction for the current image. The prediction image I' resembles the current image but its watermark has been shaken up by the motion vectors. This is shown by way of example in FIGS. 3A–3C. In FIG. 3A, the motion vectors generated by the motion estimation circuit 21 are shown as arrows. For example, motion vector 31 denotes that image block 33 of the reference image has been found to closely resemble image block 32 of current image I. FIG. 3B shows the watermark, which is the same in the current image and the reference image. For reasons of clarity, the watermark pattern is extremely simple in this in practice. FIG. 3C shows the prediction image I' generated by the motion compensation circuit. Image block 34 of this prediction image is the same as image block 33 of the reference image (see FIG. 3B) and thus resembles block 32 of the current image, but the watermark has been shifted. Again, the dominant image content is not shown in the Figure.

The difference image Q, obtained after subtracting the prediction image I' from the suspect image I can be written as:

$$Q = I - I'$$
$$= (P + W) - (P' + W')$$
$$= (P - P') + W - W'$$

in which P' and W' denote the motion-compensated image content and the motion-compensated watermark (cf. FIG. 3C), respectively.

In case of perfect motion estimation, the image residue (P−P') is very small, so that the correlation calculated by the watermark detector 1 can be approached by:

$$<Q,W> \approx <W,W> - <W,W'>$$

As can easily be understood with reference to FIGS. 3B and 3C, the term <W,W'> which represents the correlation between the watermark W and its motion-compensated counterpart W' is low, provided that the motion vectors are sufficiently different. The correlation <Q,W> is thus mainly defined by the desired term <W,W>.

It should be noted that motion estimation (21), motion compensation (23), and subtracting (3) have often already been carried out at the encoding end of a video transmission chain. For example, MPEG encoded video signals include predictively encoded (P and B–) pictures. They are transmitted as residual images plus motion vectors. In view thereof, it will be understood that a watermark in a received MPEG video signal can best be detected by subjecting the residual image to watermark detection.

Figure 4:
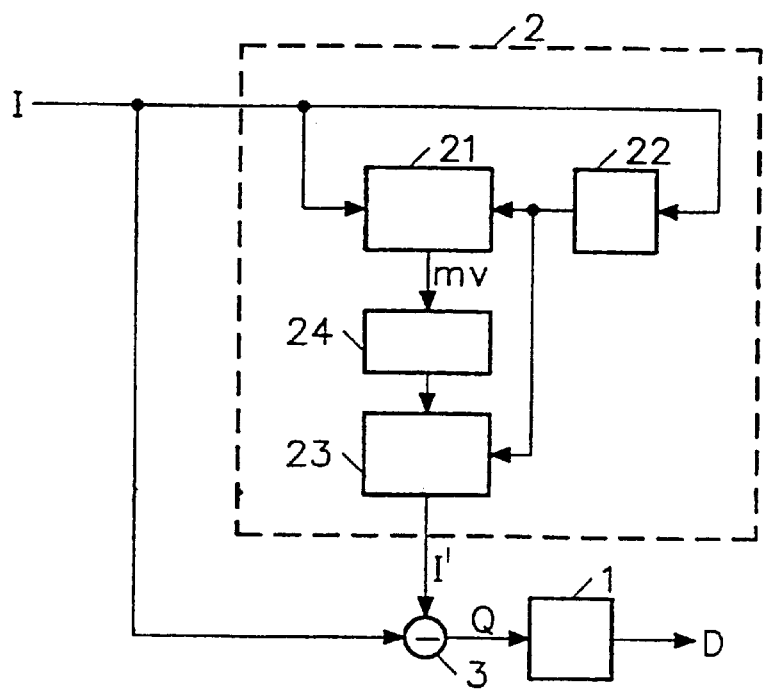
FIGS. 4 and 5 show further embodiments of devices for detecting the watermark in accordance with the invention.

The embodiment of the watermark detection device shown in FIG. 2 suffers from a reduced performance if there is no motion between the suspect image and the reference image (all motion vectors are zero). The performance is also reduced if large image areas are subject to the same motion (all motion vectors are the same). FIG. 4 shows an embodiment of the device in which this problem is alleviated. The embodiment differs from the embodiment shown in FIG. 2 in that a circuit 24 for randomly modifying the motion vectors mv is inserted between the motion estimator 21 and the motion compensator 24. It is thereby achieved that the watermark W and its motion-compensated counterpart W' are decorrelated irrespective of whether (large parts of) the image is subject to uniform motion or not. A disadvantage of randomizing the motion vectors is that the residual image content (P−P' in the formulas above) increases, even if the motion estimation is perfect. This can be solved, if necessary, by modifying the motion vectors only in image areas in which they are substantially zero or identical.

Figure 5:
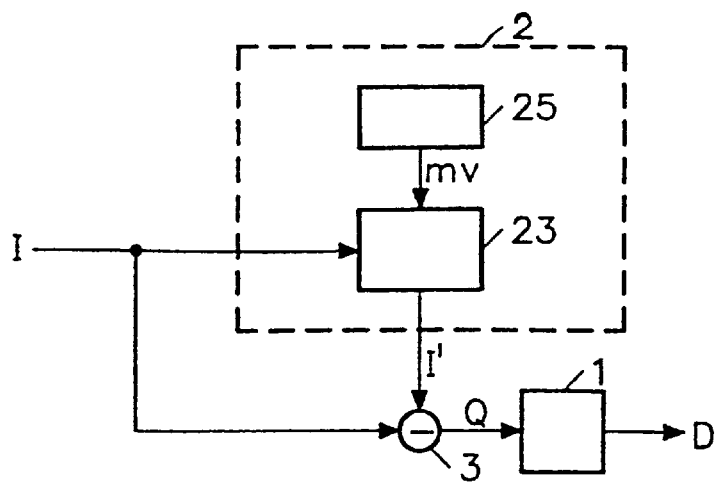

It has been found that the performance of the watermark detection is not dramatically affected by the motion vector randomization. This observation has led to a further embodiment which is shown in FIG. 5. In this embodiment, the motion estimation circuit has been omitted and replaced by a circuit 25 for randomly generating motion vectors. Not only is this embodiment cost-effective in view of the absence of an expensive motion estimator, it can also be used to detect a watermark in isolated images without any reference to earlier images having the same watermark. To this end, the motion compensation circuit 23 receives the suspect image instead of an earlier reference image. In fact, the distortion circuit 2 in FIG. 5 generates a distorted image I' by randomly displacing regions of the suspect image I as shown in FIG. 3C.

Figure 6A:
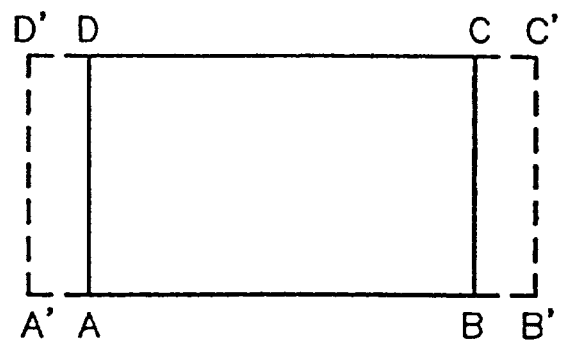
FIGS. 6A–6C show diagrams to illustrate the operation of further embodiments of a distortion circuit shown in FIG. 1.
Figure 6B:
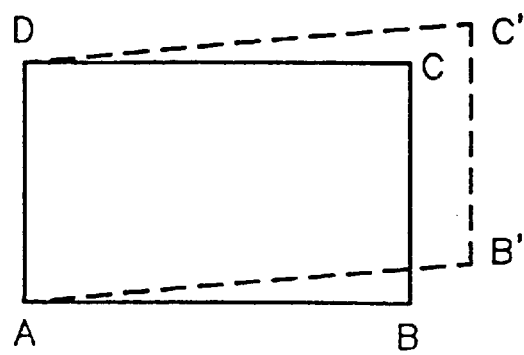
Figure 6C:
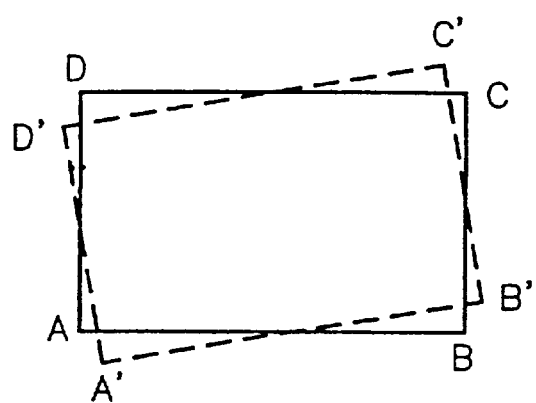

FIGS. 6A–6C show diagrams to illustrate further examples of spatially-variant linear filter operations carried out by the distortion circuit 2. In the Figs., the rectangle ABCD represents the suspect image I and the polygon A'B'C'D' represents the distorted image I'. In FIG. 6A, the distorted image is obtained by stretching (or shrinking if the image size is decreased). In FIG. 6B, the distorted image is obtained by shearing. In FIG. 6C, the distorted image is obtained by rotation.

In a further embodiment of the device in accordance with the invention, the distortion filter 2 is a non-linear filter. An example of such a filter is a median filter. A median filter is a filter which receives a series of N input samples, re-arranges the series in order of decreasing or increasing values, and selects the middle sample of the re-arranged series. Here, a median filter is also understood to mean a filter which selects the $n^{th}$ (not necessarily the middle) sample of the series. It has been found that median filtering of a watermarked image yields a closely resembling image as far as image content is concerned, but largely destroys the embedded watermark. Thus, after subtracting the filtered image I' from the suspect image I, the image information is reduced and the watermark is retained. In the embodiment shown in FIG. 6, the median filter is a 3*3 median filter. Each pixel of the suspect image is replaced by the median of the series comprising the original pixel and its eight neighboring pixels.

In summary, a watermark is assumed to be embedded in a suspect image if there is a given amount of correlation between the suspect image (I) and the watermark (W). The reliability of such a watermark detection method is considerably improved by distorting (2) the suspect image in such a way that a distorted image (I') is obtained which resembles the suspect image while the watermark is destroyed. The distorted image is then subtracted (3) from the suspect image to obtain a residual image (Q) in which the watermark is more dominant. The distortion may be a spatially-variant linear distortion such as stretching, shrinking, shearing or rotation, or a non-linear transform or filter operation.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims.

What is claimed is:

1. A method of detecting a watermark in an input image, comprising the steps of:

pre-processing the input image to generated a difference image;

determining the amount of correlation between the difference image and the watermark; and generating a watermark detection signal depending on the amount of correlation;

and in which the pre-processing includes:

deriving from the input image a distorted but resembling image which has less correlation with the watermark than has the input image, by passing the input image though a distortion filter; and subtracting the distorted image from the input image to generate the difference image as the difference between the input image and the distorted image.

2. The method of claim 1, wherein:

the input image is one of a sequence of images;

the deriving including the steps of:

estimating motion between the input image and another image of the sequence to obtain motion vectors; and applying motion compensation to the other image using the motion vectors.

3. The method of claim 2, in which the deriving further includes the step of randomly modifying the motion vectors at least in image areas in which the motion vectors are zero or are identical.

4. The method of claim 1, wherein:

the input image is divided into a plurality of image regions; and the deriving includes differently shifting the regions.

5. The method of claim 1, in which:

the input image is a block-based predictively encoded image of a motion video signal including a residual image and motion vectors; and the residual image constitutes the pre-processed image.

6. The method of claim 1, wherein the step of deriving includes non-linear filtering of the input image.

7. The apparatus of claim 6, in which the means to derive are for median filtering of the input image.

8. The method of claim 6, wherein the non-linear filtering includes median filtering of the input image.

9. The method of claim 1, in which the deriving step includes non-convolution filtering the input signal.

10. A device for detecting a watermark in an input image, comprising:

means for pre-processing the input image to generated a difference image;

means for determining the amount of correlation between the difference image and the watermark; and means for generating a watermark detection signal depending on the amount of correlation;

and in which the means for pre-processing includes:

means for deriving from the input image, a distorted but resembling image which has less correlation with the watermark than has the input image, said means for deriving including passing the input image through a distortion filter; and means for subtracting the distorted image from the input image to generate the difference image as the difference between the input image and the distorted image.

11. The apparatus of claim 10, in which:

the input image is one of a sequence of images;

the means to derive are for:

estimating motion between the input image and another image of the sequence to obtain motion vectors; and applying motion compensation to the other image using the motion vectors.

12. The apparatus of claim 10, in which:

the input image is divided into a plurality of image regions; and the means to derive are for differently shifting the regions.

13. The apparatus of claims 10, in which:

the input image is a block-based predictively encoded image of a motion video signal including a residual image and motion vectors; and the residual image constitutes the pre-processed image.

14. The apparatus of claim 10, in which the means to derive are for non-linear filtering of the input image.

15. The apparatus of claim 10, in which the means to derive are for non-convolution filtering the input signal.

16. The apparatus of claim 11, which the means to derive are for randomly modifying the motion vectors at least in image areas in which the motion vectors are zero or are identical.

* * * * *